United States Patent [19]

Nakamura

[11] Patent Number: 5,120,604
[45] Date of Patent: Jun. 9, 1992

[54] ACICULAR MAGNETIC IRON OXIDE PARTICLES AND MAGNETIC RECORDING MEDIA USING SUCH PARTICLES

[75] Inventor: Tatsuya Nakamura, Hiroshima, Japan

[73] Assignee: Toda Kogyo Corporation, Hiroshima, Japan

[21] Appl. No.: 559,426

[22] Filed: Jul. 26, 1990

Related U.S. Application Data

[63] Continuation of Ser. No. 252,800, Sep. 30, 1988, abandoned, which is a continuation-in-part of Ser. No. 108,322, Oct. 14, 1987, abandoned.

[30] Foreign Application Priority Data

Aug. 25, 1987 [JP] Japan .................................. 62-212437
Aug. 25, 1987 [JP] Japan .................................. 61-248088

[51] Int. Cl.$^5$ ................................................ B32B 5/16
[52] U.S. Cl. .................................. 428/403; 252/62.56; 252/62.58; 252/62.59; 252/62.62; 428/694
[58] Field of Search ............... 252/62.56, 62.62, 62.58, 252/62.59; 427/127, 128, 130; 428/403, 694

[56] References Cited

U.S. PATENT DOCUMENTS

| | | | |
|---|---|---|---|
| 3,047,505 | 1/1962 | Miller | 252/62.5 |
| 3,652,334 | 3/1972 | Abeck et al. | 252/62.55 |
| 3,720,618 | 3/1973 | Toda et al. | 252/62.56 |
| 3,873,462 | 3/1975 | Trandell et al. | 252/62.56 |
| 3,931,025 | 1/1976 | Woditsch et al. | 252/62.56 |
| 4,136,158 | 1/1979 | Okuda et al. | 423/632 |
| 4,259,368 | 3/1981 | Rudolf et al. | 252/62.62 |
| 4,539,261 | 9/1985 | Nakata et al. | 427/127 |
| 4,657,816 | 4/1987 | Siddiq | 428/403 |

OTHER PUBLICATIONS

Smit, et al., "Ferrites" 1959 Philips' Technical Library, Eindhoven, The Netherlands, pp. 136–139.

Manslik, et al., "Ferric Oxide Particles ... ", Chemmical Abstracts 106: 206526s (1987) Jun., No. 24, Columbus, Ohio, p. 696.

*Primary Examiner*—Jack Cooper
*Attorney, Agent, or Firm*—Nixon & Vanderhye

[57] ABSTRACT

Disclosed herein are acicular magnetic iron oxide particles coated with double coating layers consisting of a Co compound layer as a lower layer and a spinel-type ferrite layer containing Mn-Zn, Ni-Zn or Mn-Ni-Zn as an upper layer, a process for producing the acicular magnetic iron oxide particles, and magnetic recording media produced by coating a substrate with a resin composition containing the acicular magnetic iron oxide particles.

6 Claims, No Drawings

ACICULAR MAGNETIC IRON OXIDE PARTICLES AND MAGNETIC RECORDING MEDIA USING SUCH PARTICLES

This is a continuation of application Ser. No. 07/252,800, filed Sep. 30, 1988, now abandoned, which is a continuation-in-part of application Ser. No. 07/108,322, filed Oct. 14, 1987, now abandoned.

BACKGROUND OF THE INVENTION

The present invention relates to acicular magnetic iron oxide particles for high-density recording, having high coercive force and excellent erasing characteristic and coated with double coating layers consisting of a Co compound layer as a lower layer and a spinel-type ferrite layer containing Mn-Zn, Ni-Zn or Mn-Ni-Zn as an upper layer, a process for producing the acicular magnetic iron oxide particles, and magnetic recording media having excellent erasing characteristic, produced by coating a substrate with a resin composition containing the acicular magnetic iron oxide particles.

More particularly, the present invention relates to (1) acicular magnetic iron oxide particles coated with double coating layers consisting of a Co compound layer as a lower layer and a spinel-type ferrite layer containing Mn-Zn, Ni-Zn or Mn-Ni-Zn as an upper layer (the particle being hereinafter referred to as acicular magnetic iron oxide particles of the present invention); (2) a process for producing the acicular magnetic iron oxide particles comprising heat-treating a mixed solution having a pH of 11 or above obtained by mixing a water dispersion of acicular magnetic iron oxide particles with at least an aqueous solution of Co salt and an aqueous alkaline solution, at a temperature within the range of 50° to 100° C. to form a Co compound layer on the surfaces of the acicular magnetic iron oxide particles, adding Fe (II) salt and (a) Mn salt and Zn salt, (b) Ni salt and Zn salt or (c) Mn salt, Ni salt and Zn salt to the thus treated solution of pH 11 or above containing the acicular magnetic iron oxide particles coated with a Co compound layer, and heat-treating the thus mixed solution at a temperature within the range of 50° to 100° C. to form on the Co compound layer a spinel-type ferrite layer containing Mn-Zn, Ni-Zn or Mn-Ni-Zn (hereinafter referred to as spinel-type ferrite layer); and (3) magnetic recording media produced by coating a substrate with a resin composition containing the acicular magnetic iron oxide particles of the present invention.

Recently, with advancement of long time recording capacities and lightweight and compact designing of magnetic recording and reproducing devices, the necessity of higher performance of magnetic recording media such as magnetic tapes, magnetic discs, etc., is growing increasingly. Especially, the improvement of recording density chracteristics is of paramount necessity.

Generally, magnetic recording media are produced by coating a substrate with a resin composition containing magnetic particles.

For improving the recording density characteristics of magnetic recording media, it is necessary to enhance the coercive force of magnetic recording media. For attaining this, it is required that the particles of magnetic material used have as high coercive force as possible. This fact is pointed out in, for instance, "Technological Study Reports of The Institute of Electronics and Communication Engineers of Japan" MR77-36, published by The Institute of Elecronics and Communication Engineers of Japan in 1978, which states on page 37: "For increasing the recording density of a magnetic tape, it is necessary to elevate the coercive force of magnetic powder used for the tape."

Presently, so-called Co doped type acicular magnetic iron oxide particles and so-called Co coated type magnetic iron oxide particles are known as magnetic iron oxide particle having high coercive force. These magnetic iron oxide particles have a tendency to be elevated in coercive force as the Co content increases. The Co doped type magnetic iron oxide particles can be produced by first preparing Co-containing acicular goethite particles by adding Co salt to the starting material acicular goethite particles in their preparation reaction and then reducing them to form Co-containing acicular magnetite particles, or, if necessary, further oxidizing the thus obtained magnetite particles to form Co-containing maghemite particles. The Co coated type magnetic iron oxide particles can be obtained by using as precursor particles the acicular magnetite particles obtained by reducing the starting acicular goethite particles or acicular maghemite particles obtained by further oxidizing the magnetite particles, and coating the surfaces of the precursor particles with a Co compound.

Since the magnetic recording media are used repeatedly for a long time, it is also strongly required that they are stable thermally and resistant to change with time and also have excellent erasing chracteristic.

For satisfying these requirements for magnetic recording media, it is necessary that the magnetic properties of the magnetic iron oxide particles used have thermal stability, are resistant to change with time and have excellent erasing characteristic.

The magnetic iron oxide particles and magnetic recording media having high coercive force and excellent thermal stability and erasing characteristic and being resistant to change with time are most strongly demanded at present. The afore-mentioned Co doped type magnetic iron oxide particles and the magnetic recording media produced by using the particles have high coercive force, but on the other hand, they have the problem that the coercive force distribution is too wide due to diffusion of Co ions in crystals, resulting in poor thermal stability and resistance to change with time and bad erasing charactreristic.

This phenomenon is mentioned in "Technological Study Reports of The Institute of Electronics and Communication Engineers of Japan" which states: "Co solid-solution type (doped type) magnetic iron oxide powder is liable to change in coercive force thermally with time, so that it has the serious defect that when a tape is made therefrom, such tape shows poor in print-through and erasing characteristic. Such defect is considered attributable to the fact that Co ions move in crystals even at room temperature."

The Co coated type magnetic iron oxide particles and the magnetic recording media produced by using such particles have high coercive force and are also more stable thermally and resistant to change with time, and more excellent in erasing characteristic than the Co doped type magnetic iron oxide particles. Such fact is noted from "Technological Study Reports of The Institute of Electronics and Communication Engineers of Japan" which states: ". . . the Co epitaxial (Co coated type) magnetic iron oxide powder, because of its double-coated layer structure, is free of these defects and stable thermally and resistant to change with time, and the tape produced by using such magnetic powder has excellent print-through and erasing charcteristic."

However, there is no end to the request for improvements of erasing charcteristic in recent technology, and the Co coated type magnetic iron oxide particles and magnetic recording media produced by using such particles can hardly be seemed satisfactory in erasing characteristic, due to wide spread of coercive force distribution.

This fact is referred to in many literatures. For instance, Japanese Patent application Laid-Open (KOKAI) No. 61-17426 (1986) states in its specification: "In the case of magnetic powder using the $\gamma$—$Fe_2O_3$ particles, it was found that the coercive force distribution widens as the $\gamma$—$Fe_2O_3$ particles are reduced in size, and there is a tendency that the coercive force distribution is further widened when the particles are coated with cobalt compound layer ... When the cobalt coated type $\gamma$—$Fe_2O_3$ particles are reduced in size for attaining high density recording, although a desired coercive force (Hc) is obtained, the produced magnetic powder has an unfavorable coercive force distribution and is poor in erasing characteristic."

The coercive force distribution of Co coated type magnetic iron oxide particles tends to widen as the amount of Co increases, resulting in worse erasing characteristic of the particles. Thus, there is an inverse corelation between the amount of Co and improvement of coercive force distribution.

Under these circumstances, there has been in the industries a strong request for the establishment of a process capable of producing Co coated type magnetic iron oxide particles further improved in erasing characteristic while maintaining high coercive force and the magnetic recording media coated with a resin composition containing such particles.

As a result of extensive studies for producing Co coated type magnetic iron oxide particles further improved in erasing characteristic while maintaining the desired coercive force and the magnetic recording media coated with a resin composition containing the particles, it has been found that (1) acicular magnetic iron oxide particles coated with double coating layers consisting of a Co compound layer as a lower layer and a spinel-type ferrite layer containing Mn-Zn, Ni-Zn or Mn-Ni-Zn as an upper layer, obtained by first preparing a mixed solution with a pH of 11 or above by mixing a water dispersion of acicular magnetic iron oxide particles with at least an aqueous solution of Co salt and an aqueous alkaline solution, heat-treating the thus mixed solution at a temperature of 50°-100° C. to form a Co compound layer on the surfaces of the acicular magnetic iron oxide particles, then adding Fe (II) salt and (a) Mn salt and Zn salt, (b) Ni salt and Zn salt or (c) Mn salt, Ni salt and Zn salt to the mixed solution of pH 11 or above containing the acicular magnetic iron oxide particles coated with a Co compound layer, and heat treating the thus mixed solution at a temperature of 50°-100° C. to form on the Co compound layer a spinel-type ferrite layer containing Mn-Zn, Ni-Zn or Mn-Ni-Zn, and (2) magnetic recording media produced by coating a substrate with a resin composition containing the thus obtained acicular magnetic iron oxide particle have high coercive force and excellent erasing charcteristic. The present invention has been attained on the basis of said findings.

SUMMARY OF THE INVENTION

In a first aspect of the present invention, there is provided acicular magnetic iron oxide particles coated with double coating layers consisting of a Co compound layer as a lower layer and a spinel-type ferrite layer containing Mn-Zn, Ni-Zn or Mn-Ni-Zn as an upper layer.

In a second aspect of the present invention, there is provided a process for producing acicular magnetic iron oxide particles comprising the steps of mixing a water dispersion of acicular magnetic iron oxide particles as core particles with at least at aqueous solution of a Co salt and an aqueous alkaline solution to prepare a mixed solution having a pH of 11 or above, heat-treating the mixed solution at a temperature in the range of 50° to 100° C. to form a Co compound layer on the surfaces of the acicular magnetic iron oxide particles, then adding Fe (II) salt and (a) Mn salt and Zn salt, (b) Ni salt and Zn salt or (c) Mn salt, Ni salt and Zn salt to the thus treated solution of pH 11 or above containing the acicular magnetic iron oxide particles coated with a Co compound layer, and heat-treating the thus mixed solution at a temperature in the range of 50° to 100° C. to form on the Co compound layer a spinel-type ferrite layer containing Mn-Zn, Ni-Zn or Mn-Ni-Zn.

In a third aspect of the present invention, there is provided a magnetic recording medium made by coating a substrate with a resin composition containing the acicular magnetic iron oxide particles coated with double coating layers consisting of a Co compound layer as a lower layer and a spinel-type ferrite layer containing Mn-Zn, Ni-Zn or Mn-Ni-Zn as an upper layer.

DETAILED DESCRIPTION OF THE INVENTION

The important point of the present invention is that a marked improvement of erasing characteristic can be realized while maintaining high coercive force by use of an acicular magnetic iron oxide particles of the present invention coated with double coating layers consisting of a Co compound layer as a lower layer and a spinel-type ferrite layer containing Mn-Zn, Ni-Zn or Mn-Ni-Zn as an upper layer, and a magnetic recording media produced by coating a substrate with a resin composition containing the acicular magnetic iron oxide particles of the present invention.

The present invention also has an advantage that in case of producing a magnetic recording medium by coating a substrate with a resin composition containing Co coated-type acicular magnetic iron oxide particles having especially an Ni-containing as a spinel-type ferrite layer, it is possible to not only improve the erasing characteristic but also further enhance the coercive force.

Further, according to the present invention, the magnetic recording media produced by coating of a substrate with a resin composition containing the Co coated-type acicular magnetic iron oxide particles of the present invention which have undergone a heat-treatment at a temperature of 100°-200° C. after coating treatment with a spinel-type ferrite layer can be further enhanced in coercive force while maintaining the excellent erasing charcteristic.

The magnetic iron oxide particles coated with a Co compound layer followed by further coating with spinel-type ferrite are disclosed in Japanese Patent Application Laid-Open (KOKAI) No. 60-165703 (1985). In the magnetic iron oxide particles disclosed therein, the surfaces of the magnetic iron oxide particles coated with a Co compound are further coated with Zn ferrite, but such coating is intended to improve saturation magnetization and has no relation to the improvement of erasing characteristic intended to realize in the present invention. Thus, the magnetic iron oxide particles disclosed in Japanese Patent Application Laid-Open (KOKAI) No. 60-165703 are quite different in action and effect from those of the present invention.

As the acicular magnetic iron oxide particles as a core of the particles of the present invention, there can be used acicular maghemite particles, acicular magnetite particles ($FeOx.Fe_2O_3$, $0<x\leq 1$) or these particles containing one or more of Co, Ni, Si, Al, Zn and P ions, having an average major axis diameter of not more than 0.5 $\mu$m preferably 0.1 to 0.4 $\mu$m and an aspect ratio (major axis:minor axis) of not less than 5:1, preferably 7:1 to 12:1.

Coating of the acicular magnetic iron oxide particles with a Co compound can be effected by mixing a water dispersion of acicular magnetic iron oxide particles with at least an aqueous solution of Co salt and an aqueous alkaline solution, and heat-treating the thus obtained mixed solution having a pH of 11 or above, preferably 12 or above at a temperature within the range of 50° to 100° C., preferably 80° to 100° C. The aqueous solution of Co salt may contain, if necessary, an aqueous solution of Fe (II) salt. As the aqueous solution of Co salt, there can be used an aqueous solution of cobalt sulfate, cobalt chloride, cobalt nitrate or the like. The atmosphere for the coating treatment may be a non-oxidizing atmosphere under a stream of an inert gas such as $N_2$ or an oxidizing atmosphere under a stream of an oxygen-containing gas such as air.

The mixed Co salt is 0.4 to 8.0% by weight, preferably 2.0 to 4.0% by weight (calculated as $Co^{2+}$) based on the acicular magnetic iron oxide particles. The optionally added Fe(II) salt is 1.0 to 16.0% by weight, preferably 4.0 to 8.0% by weight (calculated as $Fe^{2+}$) based on the acicular magnetic iron oxide particles. In the process of the present invention, the total amount of the mixed Co salt is deposited on the surface of the acicular magnetic iron oxide particles, as Co compound layer.

The spinel-type ferrite layer in the present invention can be formed by adding Fe (II) salt and (a) Mn salt and Zn salt, (b) Ni salt and Zn salt, or (c) Mn salt, Ni salt and Zn salt to a mixed solution of pH 11 or above containing the acicular magnetic iron oxide particles coated with a Co compound layer, and then heat-treating the thus obtained mixed solution at a temperature within the range of 50° to 100° C., preferably 80° to 100° C. Ferrous sulfate, ferrous chloride and the like can be used as Fe (II) salt. Manganese sulfate, manganese chloride, manganese nitrate and the like can be used as Mn salt. Nickel sulfate, nickel chloride and the like can be used as Ni salt. Zinc sulfate, zinc chloride, zinc nitrate and the like can be used as Zn salt. The atmosphere for the heat-treatment may be a non-oxidizing atmosphere under a stream of an inert gas such as $N_2$ or an oxidizing atomosphere under a stream of an oxygen-containing gas such as air.

The added Fe (II) salt is 0.3 to 15.0% by weight, preferably 2.0 to 12.0% by weight (calculated as $Fe^{2+}$ based on the acicular magnetic iron oxide particles coated with a Co compound layer. Also, the added Mn salt is 0.2 to 6.0% by weight, preferably 0.5 to 5.0% by weight (calculated as $Mn^{2+}$) based on the acicular magnetic iron oxide particles coted with a Co compound layer; the added Ni salt is 0.2 to 6.0% by weight, preferably to 0.5 to 5.0% by weight (calculated as $Ni^{2+}$) based on the acicular magnetic iron oxide particles coated with a Co compound layer; and the added Zn salt is 0.2 to 6.0% by weight, preferably 0.5 to 4.0% by weight (calculated as $Zn^{2+}$) based on the acicular magnetic iron oxide particles coated with a Co compound layer.

In the process of the present invention, the total amount of the added Fe (II) salt, and (a) Mn salt and Zn salt, (b) Ni salt and Zn salt, or (c) Mn salt, Ni salt and Zn salt is deposited on the surface of the acicular magnetic iron oxide particles coated with a Co compound layer, as the spinel-type ferrite layer containing Mn-Zn, Ni-Zn or Mn-Ni-Zn.

The amount of the contained Mn-Zn, Ni-Zn or Mn-Ni-Zn in the spinel-type ferrite layer in the present invention is 1.0 to 10.0% by weight, preferably 2.0 to 9.0% by weight based on the acicular magnetic iron oxide particles coated with a Co compound. In the case of less than 1.0% by weight, the object of the present invention can not be attained satisfactorily. The desired improvement of erasing characteristic can be achieved in the case of over 10.0% by weight, but it is meaningless in the excess addition of the elements.

The ratio of Mn, Ni or Mn-Ni to the sum of Mn, Ni and Zn in spinel-type ferrite of the present invention is 0.1 to 80 atom %, preferably 10 to 75 atom %. When the ratio is less than 0.1 atom % or greater than 80 atom %, no satisfactory improvement of erasing characteristic can be achieved.

The thus obtained acicular magnetic iron oxide particles coated with double coating layers in the present invention may be, if necessary, heated at a temperature of 100° to 200° C., preferably 120° to 160¼° C. When the heating temperature is below 100° C., a long-time heat treatment is required, which is disadvantageous in industrial utility and economy. When the heating temperature is higher than 200° C., cobalt ions may be caused to diffuse in crystals, making the produced particles unstable thermally and poor resistant to change with time. The atmosphere for this heat-treatment may be either a non-oxidizing atmosphere under a streatm of an inert gas such as $N_2$ or an oxidizing atmosphere under a stream of an oxygen-containing gas such as air.

The magnetic recording media according to the present invention can be obtained by coating a substrate with a resin composition containing the acicular magnetic iron oxide particles coated with double coating layer of the present invention in a known way. The content of the acicular magnetic iron oxide particles of the present invention in the resin composition is 60 to 90% by weight, preferably 65 to 85% by weight.

The resin composition may contain the ordinarily used additives such as dispersant, lubricant, abrasive, antistatic agent, hardener, etc.

As the substrate material in the present invention, there can be used films of synthetic resins such as polyethylene terephthalate, polyethylene, polypropylene, polycarbonate, polyethylene naphthalate, polyamide, polyamide-imide, polyimide, polysulfone, etc., foils and plates of metals such as aluminum, stainless steel, etc., and various types of paper, which are commonly used in the production of magnetic recording media.

As the resin in the present invention, vinyl chloride-vinyl acetate copolymer, vinyl chloride-vinyl acetate-maleic acid copolymer, polyvinyl butyral, cellulose derivatives such as nitrocellulose, polyurethane elastomer, polyester resin, synthetic rubber such as acrylonitrile-butadiene copolymer and polybutadiene, epoxy resin, polyamide resin, electron radiation curable acrylic urethane resin and the like or their mixtures, which are commonly used in the production of magnetic recording media, may be exemplified.

The acicular magnetic iron oxide particles of the present invention have high coercive force and excellent erasing characteristic, so that they are suited for use as magnetic iron oxide particles for high-density recording.

The acicular magnetic iron oxide particles of the present invention have an average major axis diameter of 0.5 $\mu$m or below, preferably 0.1–0.4 $\mu$m, an aspect ratio (major axis:minor axis) of 5:1 or greater, preferably 7:1 to 12:1, a coercive force of 600 Oe or above, preferably 650 Oe or above and an erasing characteristic value of 72.0 dB or above, preferably 73.0 dB or above.

Further, the magnetic recording media according to the present invention have high coercive force and excellent erasing characteristic owing to the high coercive force and excellent erasing characteristic of the acicular magnetic iron oxide particles of the present invention, so that they are best suited for use as magnetic recording media for high-density recording which are most keenly required in the industries at present. The magnetic recording media according to the present invention have a coercive force of 600 Oe or above, preferably 650 Oe or above and an erasing characteristic value of 71.0 dB or above, preferably 72.5 dB or above.

The present invention will hereinafter be described more particularly with reference to the examples thereof and comparative examples.

The erasing characteristic of the particles and recording media in the following examples and comparative examples were measured according to the method shown on pages 152–153 of "A Collection of Resumes of Lectures at the Spring Conference, 1986" of Journal of the Japan Society of Powder and Powder Metallurgy. That is, a DC magnetic field of 10 KOe was applied to the sample and the remanent magnetization (Mr) was measured. Then the sample was set in an erasing device and, after applying an erasing magnetic field varying from 1,500 Oe to zero, the remanent magnetization (Me) was measured. The erasing characteristic was shown by the value of 20 log Me/Mr (dB).

Coating of Co coated type acicular magnetic iron oxide particles with spinel-type ferrite layer (Examples 1–4 and Comparative Examples 1–4)

EXAMPLE 1

Used as precursor were the acicular $\gamma$—$Fe_2O_3$ particles [average major axis diameter=0.3 $\mu$m; aspect ratio (major axis:minor axis)=8:1; coercive force=370 Oe]. A dispersion obtained by dispersing 100 g of the precursor particles in 2 liters of water was mixed with an aqueous solution having dissolved therein 0.2 mol of ferrous ion obtained by using 10.0 g of $FeSO_4$ [Corresonding to 3.68% by weight (calculated as $Fe^{2+}$) based on $\gamma$—$Fe_2O_3$] and 0.1 mol of cobalt ion obtained by using 5.0 g of $CoSO_4$ [corresponding to 1.90% by weight (calculated as $Co^{2+}$) based on $\gamma$—$Fe_2O_3$] and then 500 ml of a 6N NaOH solution was added thereto to prepare a mixed solution of pH 14. This mixed solution was heated to 95° C. and left as was under stirring for 300 minutes while shutting off air, thereby forming sedimentation of dark brown particles.

A part of the reaction solution was withdrawn and filtered, washed with water and dried by the conventional methods to obtain dark brown particles. The results of fluorescent X-ray analysis and X-ray diffraction of the obtained particles showed that they were the acicular $\gamma$—$Fe_2O_3$ particles coated with a Co compound on their surfaces (the amount of Co corresponding to 2.6% by weight based on the Co-coated—$Fe_2O_3$ particles). These acicular $\gamma$—$Fe_2O_3$ particles coated with Co compound had an average major axis diameter of 0.3 $\mu$m, an aspect ratio (major axis:minor axis) of 8:1, a coercive force of 702 Oe and an erasing characteristic value of 69.5 dB.

To the mother solution containing the dark brown sedimented particles was added an aqueous solution having dissolved therein 0.1 mol of Mn ion obtained by using 4.0 g of $MnSO_4$ [corresponding to 1.46% by weight (calculated as $M^{2+}$) based on $\gamma$—$Fe_2O_3$], 0.1 mol of Zn ion obtained by using 4.0 g of $ZnSO_4$ [corresponding to 1.62% by weight (calculated as $Zn^{2+}$) based on $\gamma$—$Fe_2O_3$] and 0.4 mol of ferrous ion obtained by using 16.0 g of $FeSO_4$ [corresponding to 5.88% by weight (calculated as $Fe^{2+}$) based on $\gamma$—$Fe_2O_3$], and the mixed solution was maintained at a pH of 12 and a temperature of 95° C. under stirring for 180 minutes while preventing entrance of air, thereby forming the dark brown sedimented particles. The reaction solution containing the dark brown sedimented particles was filtered, washed with water and dried by the conventional methods.

The results of fluorescent X-ray analysis and X-ray diffraction of the obtained dark brown particles showed that they were the acicular $\gamma$—$Fe_2O_3$ particles having formed on the Co compound layer an additional spinel-type ferrite layer containing Mn-Zn [spinel-type ferrite containing Mn-Zn {Mn/(Mn+Zn)=48 atom %} is equivalent to 2.9% by weight of total amount of Mn and Zn based on Co-coated acicular $\gamma$—$Fe_2O_3$]. The obtained acicular $\gamma$—$Fe_2O_3$ particles coated with a double coated layer consisting of a Co compound layer as a lower layer and a spinel-type ferrite layer containing Mn-Zn as an upper layer had an average major axis diameter of 0.3 $\mu$m and an aspect ratio (major axis:minor axis) of 7:1, and showed a coercive force of 698 Oe and erasing characteristic value of 74.1 dB. When these particles were further subjected to a 60-minute heat-treatment at 150° C. under an $N_2$ gas stream, the resulting particles showed a coercive force of 749 Oe and erasing characteristic value of 74.5 dB.

By way of comparison, the Co compound-coated acicular $\gamma$—$Fe_2O_3$ particles were subjected to a 60-minute heat treatment at 150° C. under an $N_2$ gas stream. The obtained particles showed a coercive force of 741 Oe and erasing characteristic value of 70.2 dB.

EXAMPLE 2

Used as precursor were the acicular $\gamma$—$Fe_2O_3$ particles [average major axis diameter=0.3 $\mu$m; aspect ratio (major axis:minor axis)=8:1; coercive force=370 Oe]. A dispersion prepared by dispersing 100 g of the precursor particles in 2 liters of water was mixed with an aqueous solution having dissolved therein 0.2 mol of ferrous ion obtained by using 10.0 g of $FeSO_4$ corresponding to 3.68% by weight (calculated as $Fe^{2+}$) based on $\gamma$—$Fe_2O_3$] and 0.1 mol of cobalt ion obtained by using 5.0 g of $CoSO_4$ [corresponding to 1.90% by weight (calculated as $Co^{2+}$) based on $-Fe_2O_3$]. The 500 ml of a 6N NaOH solution was further added thereto to obtain a mixed solution of pH 14. This mixed solution ws heated to 95° C. and maintained at this temperature under stirring for 300 minutes while shutting off air, thereby forming formation of dark brown sedimented particles.

A part of the mother solution was drawn out and filtered, washed with water and dried to obtain dark brown particles. The results of fluorescent X-ray analysis and X-ray diffraction of these particles showed that they were the acicular $\gamma-Fe_2O_3$ particles coated with a layer of Co compound (Co amount corresponds to 2.6% by weight based on Co-coated $\gamma-Fe_2O_3$ particles). These Co compound-coated acicular $\gamma-Fe_2O_3$ particles had an average major axis diameter of 0.3 μm and an aspect ratio (major axis:minor axis) of 8:1 and showed a coercive force of 702 Oe and erasing characteristic value of 69.5 dB.

To the mother solution containing dark brown sedimented particles was added 500 ml of an aqueous solutin having dissolved therein 0.1 mol of Ni ion obtained by using 4.5 g of $NiSO_4$ [corresponding to 1.70% by weight (calculted as $Ni^{2+}$) based on $\gamma-Fe_2O_3$, 0.1 mol of Zn ion obtaine by using 3.0 g of $ZnSO_4$ [corresponding to 1.22% by weight (calculated as $Zn^{2+}$) based on $\gamma-Fe_2O_3$] and 0.4 mol of ferrous ion obtained by using 14.0 g of $FeSO_4$ [corresponding to 5.15% by weight (calculated as $Fe^{2+}$) based on $\gamma-Fe_2O_3$], and the mixed solution was maintained at a pH of 12 and a temperature of 95° C. under stirring for 180 minutes while shutting off air, thereby forming dark brown sedimented particles. The reaction solution containing the dark brown sedimented particles was filtered, washed with water and dried by the conventional methods.

The results of fluorescent X-ray analysis and X-ray diffraction of the obtained dark brown particles showed that they were the acicular $\gamma-Fe_2O_3$ particles having formed on the Co compound layer an additional spinel-type ferrite layer [spinel-type ferrite containing {Ni-Zn Ni/(Ni+Zn)=64 atoms %} corresponds to 6.0% by weight in terms of total amount of Ni and Zn based on Co-coated acicular $\gamma-Fe_2O_3$]. The obtained acicular $\gamma-Fe_2O_3$ particles coated with a double coated layer consisting of a Co compound layer as a lower layer and a spinel-type ferrite layer containing Ni-Zn as an upper layer had an average major axis diameter of 0.3 μm and an aspect ratio (major axis:minor axis) of 7:1, and showed a coercive force of 786 Oe and erasing characteristic value of 73.3 dB. When these particles were further subjected to a 60-minute heat treatment at 150° C. under an $N_2$ gas stream, the resulting particles showed a coercive force of 798 Oe and erasing chracteristic value of 74.3 dB.

For the purpose of comparison, the Co compound-coated acicular $\gamma-Fe_2O_3$ particles were subjected to a 60-minute heat treatment at 150° C. under an $N_2$ gas stream. The obtained particles showed a coercive force of 741 Oe and erasing characteristic value of 70.2 dB.

EXAMPLE 3

Used as precursor were the acicular magnetite particles [average major axis diameter=0.4 μm; aspect ratio (major axis:minor axis)=10:1; coercive force =385 Oe] containing 4.2% by weight of $Fe^{2+}$ion. A dispersion obtained by dispersing 100 g of the precursor particles in 2 liters of water was mixed with an aqueous solution having dissolved therein 0.2 mol of cobalt ion obtained by using 14.0 g of $CoSO_4$ [corresponding to 5.32% by weight (calculated as $Co^{2+}$) based on acicular magnetite particles]. Then 500 ml of a 6N NaOH solution was further added thereto to prepare a mixed solution of pH 14. This mixed solution was heated to 100° C. and allowed to stand under stirring for 240 minutes while shutting off air, thereby forming dark brown sedimented particles.

A part of the reaction solution was withdrawn and filtered, washed with water and dried according to the conventional methods to obtain dark brown particles. The results of fluorescent X-ray analysis and X-ray diffraction of the obtained particles showed that they were the acicular $\gamma-Fe_2O_3$ particles coated with Co compound (Co amount corresponds to 5.1% by weight based on Co-coated $\gamma-Fe_2O_3$ particles). These Co compound-coated acicular $\gamma-Fe_2O_3$ particles had an average major asis diameter of 0.4 μm and an aspect ratio (major axis:minor axis) of 10:1, and showed a coercive force of 714 Oe and erasing characteristic value of 70.3 dB.

To the mother solutin containing dark brown sedimented particles was added an aqueous solutin having dissolved therein 0.2 mol of Mn ion obtained by using 7.0 g of $MnSO_4$ [corresponding to 2.55% by weight (calculated as $Mn^{2+}$) based on acicular magnetite particles] 0.1 mol of Zn ion obtained by using 5.0 g of $ZnSO_4$ [corresponding to 2.03% by weight (calculated as $Zn^{2+}$) based on acicular magnetite particles] and 0.4 mol of ferrous ion obtained by using 25.0 g of $FeSO_4$ [corresonding to 9.19% by weight (calculated as $Fe^{2+}$) based on acicular magnetite particles], and the mixed solution was allowed to stand at a pH of 11 and a temperature of 80° C. under stirring for 300 minutes while shutting off air, whereupon dark brown particles were formed as sediment. The reaction solution containing the dark brown sedimented particles was filtered, washed with water and dried by the conventional methods.

The results of fluorescent X-ray analysis and X-ray diffraction of the obtained dark brown particles showed that they were the acicular $\gamma-Fe_2O_3$ particles having formed on the Co compound layer an additional spinel-type ferrite layer containing Mn-Zn [spinel-type ferrite containing Mn-Zn {Mn/(Mn+Zn)=68 atom %}corresponds to 4.2% by weight of total amount of Mn and Zn based on Co-coated aciculr $\gamma-Fe_2O_3$}. The obtained acicular $\gamma-Fe_2O_3$ particles coated with a double coated layer consisting of a Co compound layer as a lower layer and a spinel-type ferrite layer containing Mn-Zn as an upper layer had an average major axis diameter of 0.4 μm and an aspect ratio (major axis:minor axis) of 10:1, and showed a coercive force of 706 Oe and erasing charateristic value of 75.0 dB. When these particles were further subjected to a 60-minute heat treatment at 150° C. under an $N_2$ gas stream, the resulting particles showed a coercive force of 722 Oe and erasing characteristic value of 75.6 dB.

By way of comparison, the Co compound-coated acicular $\gamma-Fe_2O_3$ particles were subjected to a 60-minute heat treatment at 150° C. under an $N_2$ gas stream. The obtained particles showed a coercive force of 730 Oe and erasing characteristic value of 70.7 dB.

EXAMPLE 4

Used as precursor were the acicular magnetite particles [average major axis diameter of 0.4 μm; aspect ratio (major axis:minor axis)=10:1; coercive force: 385 Oe] containing 4.2% by weight of $Fe^{2+}$ ion. A dispersion obtained by dispersing 100 g of the precursor particles in 2 liters of water was mixed with an aqueous solution having dissolved therein 0.2 mol of cobalt ion obtained by using 14.0 g of $CoSO_4$ [corresponding to 5.32% by weight (calculated as $Co^{2+}$) based on acicular magnetite particles], followed by further addition of 500 ml of a 6N NaOH solution to prepare a mixed solution of pH 14. This mixed solution was heated to 100° C. and allowed to stand under stirring for 240 minutes while shutting off air, thereby forming sedimentation of dark brown particles.

A part of the reaction solution was withdrawn and filtered, washed with water and dried by the conventional methods to obtain dark brown particles. The results of fluorescent X-ray analysis and X-ray diffraction of these particles showed that they were the acicular $\gamma-Fe_2O_3$ particles coated with Co compound (Co amount corresponds to 5.1% by weight based on Co-coated $\gamma-Fe_2O_3$ particles). These Co compound-coated acicular $\gamma-Fe_2O_3$ particles had an average major axis diameter of 0.4 μm and an aspect ratio (major axis:minor axis) of 10:1, and showed a coercive force of 714 Oe and erasing characteristic value of 70.3 dB.

To the mother solution containing dark brown sedimented particles was added an aqueous solution having dissolved therein 0.2 mol of Ni ion obtained by using 12.5 g of $NiSO_4$ [corresponding to 4.74% by weight (calculated as $Ni^{2+}$) based on aciculr magnetite particles], 0.1 mol of Zn ion obtained by using 2.5 g of $ZnSO_4$ [corresnding to 1.01% by weight (calculated as $Zn^{2+}$) based on acicular magnetite particles] and 0.4 mol of ferrous ion obtained by using 30.0 g of $FeSO_4$ [corresponding to 11.03% by weight (calculated as $Fe^{2+}$) based on acicular magentite particles], and the mixed solution was maintained at a pH of 12 and a temperature of 80° C. under stirring for 300 minutes while shutting off air, thereby forming sedimentation of dark brown particles. The reaction solution containing the dark brown sedimented particles was filtered, washed with water and dried by the conventional methods.

The results of fluorescent X-ray analysis and X-ray diffraction of the obtained dark brown particles showed that they were the acicular $\gamma-Fe_2O_3$ particles having formed on the Co compound layer a spinel-type ferrite layer containing Ni-Zn [spinel-type ferrite containing Ni-Zn {Ni/(Ni+Zn)=71 atom %}corresponds to 5.0% by weight of total amount of Ni and Zn based on Co-coated acicular $\gamma-Fe_2O_3$]. The obtained acicular $\gamma-Fe_2O_3$ particles coated with a double coated layer consisting of a Co compound layer as a lower layer and a spinel-type ferrite layer containing Ni-Zn as an upper layer had an average major axis diameter of 0.4 μm and an aspect ratio (major axis:minor axis) of 10:1, and showed a coercive force of 751 Oe and erasing characteristic value of 74.4 dB. When these particles were further subjected to a 60-minute heat treatment at 150° C. under an $N_2$ gas stream, the resulting particles showed a coercive force of 773 Oe and erasing characteristic value of 74.2 dB.

By the way of comparison, the Co compound-coated acicular $\gamma-Fe_2O_3$ particles were subjected to a 60-minute heat treatment at 150° C. under an $N_2$ gas stream. The obtained particles showed a coercive force of 730 Oe and erasing characteristic value of 70.7 dB.

COMPARATIVE EXAMPLE 1

By following the same procedure as Example 1 except that zinc sulfate and ferrous sulfate was added instead of adding manganese sulfate, zinc sulfate and ferrous sulfate, there were produced the acicular $\gamma-Fe_2O_3$ particles having a Zn-containing spinel-type ferrite layer formed on the Co compound layer. The obtained acicular $\gamma-Fe_2O_3$ particles coated with a double coated layer consisting of a Co compound layer as a lower layer and a Zn-containing spinel type ferrite layer as an upper layer showed a coercive force of 705 Oe and erasing characteristic value of 69.0 dB.

COMPARATIVE EXAMPLE 2

By following the same procedure as Example 1 except that manganese sulfate and ferrous sulfate was added instead of adding manganese sulfate, zinc sulfate and ferrous sulfate, there were produced the acicular $\gamma-Fe_2O_3$ particles having an Mn-containing spinel-type ferrite layer formed on the Co compound layer. The obtained acicular $\gamma-Fe_2O_3$ particles coated with a double coated layer consisting of a Co compound layer as a lower layer and a spinel-type ferrite layer as an upper layer showed a coercive force of 690 Oe and erasing characteristic value of 70.8 dB.

COMPARATIVE EXAMPLE 3

By following the same procedure as Example 2 except that nickel sulfate and ferrous sulfate was added instead of adding nickel sulfate, zinc sulfate and ferrous sulfate, there were produced the acicular $\gamma-Fe_2O_3$ particles having an Ni-containing spinel-type ferrite layer formed on the Co compound layer. The obtained acicular $\gamma-Fe_2O_3$ particles coated with a double coated layer consisting of a Co compound layer as a lower layer and an Ni-containing spinel type ferrite layer as an upper layer showed a coercive force of 708 Oe and erasing characteristic value of 69.7 dB.

COMPARATIVE EXAMPLE 4

By using the same method as in Example 1 except for the addition of 500 ml of an aqueous solution having dissolved therein manganese sulfate and zinc sulfate in addition to cobalt sulfate, there were produced the dark brown sedimental particles. The reaction solution containing the dark brown sedimented particles was filtered, washed with water and dried according to the conventional methods. The results of fluorescent X-ray analysis and X-ray diffraction of the obtained dark brown particles showed that they were the acicular $\gamma-Fe_2O_3$ particles coated with the Co, Mn and Zn compounds. These particles showed a coercive force of 704 Oe and erasing characteristic value of 69.3 dB.

Production of magnetic recording media (Examples 5-12 and Comparative Examples 5-12)

EXAMPLE 5

100 parts by weight of fine particles coated with a double coated layer consisting of a Co compound layer as a lower layer and an Mn-Zn-containing spinel-type ferrite layer as an upper layer, obtained in Example 1 but not subjected to the heat treatment, 14 parts by weight of VAHG (vinyl chloride-vinyl acetate-vinyl alcohol copolymer, made by U.C.C. Inc., U.S.A.), 1 part by weight of myristic acid. 30 parts by weight of toluene, 30 parts by weight of methyl ethyl ketone, 1 part by weight of $Al_2O_3$ powder and 2 parts by weight of carbon black were kneaded for 90 minutes by a kneader. The kneaded material was diluted by adding 45 parts by weight of toluene and 45 parts by weight of methyl ethyl ketone and then mixed and dispersed by a sand grinder for 3 hours.

To the resulting dispersion was added 140 parts by weight of a methyl ethyl ketone solution containing 14 parts by weight in solids of a polyurethane resin (NIPPORAN 2304 made by Nippon Polyurethane Kogyo KK), followed by mixing for 30 minutes and filtration. The resulting material was mixed with 3 parts by weight of COLONATE L (a trifunctional low-molecular weight isocyanate compound, produced by Nippon Polyurethane Kogyo K.K.) to prepare a magnetic coating material.

This magnetic coating material was coated on a 12 μm thick polyester base film and dried to form a 4 μm thick magnetic layer. The coated film was calendered and then cut to a width of 3.81 mm to make a magnetic tape.

This magnetic tape had the following magnetic properties: coercive force=680 Oe, erasing characteristic value 74.4 dB.

EXAMPLES 6-12 AND COMPARATIVE EXAMPLES 5-12

Magnetic tapes were made according to Example 5 by using the acicular magnetic iron oxide particles coated with a double coated layer obtained in Examples 1-4, the acicular magnetic iron oxide particles coated with a Co compound produced by way of comparison in Examples 1 and 3 and the particles obtained in Comparative Examples 1-4.

The magnetic properties of these magnetic tapes are shown in Table 1.

TABLE 1

| Example No. and Comparative Example No. | Type of magnetic iron oxide particles (Example No. and Comparative Example No.) | Coercive force (Oe) | Erasing characteristic value (dB) |
|---|---|---|---|
| Example 5 | Example 1 (not heat-treated) | 680 | 74.4 |
| Example 6 | Example 1 (heat-treated) | 723 | 74.1 |
| Example 7 | Example 2 (not heat-treated) | 765 | 73.0 |
| Example 8 | Example 2 (heat-treated) | 770 | 73.4 |
| Example 9 | Example 3 (not heat-treated) | 691 | 75.5 |
| Example 10 | Example 3 (heat-treated) | 704 | 76.1 |
| Example 11 | Example 4 (not heat-treated) | 738 | 73.8 |
| Example 12 | Example 4 (heat-treated) | 752 | 74.0 |
| Com. Example 5 | co-coated $\gamma$-$Fe_2O_3$ particles in Example 1 (not heat-treated) | 680 | 68.1 |
| Com. Example 6 | co-coated $\gamma$-$Fe_2O_3$ particles in Example 1 (heat treated) | 719 | 68.9 |
| Com. Example 7 | co-coated $\gamma$-$Fe_2O_3$ particles in Example 3 (not heat-treated) | 695 | 69.2 |
| Com. Example 8 | co-coated $\gamma$-$Fe_2O_3$ particles in Example 3 (heat-treated) | 708 | 70.1 |
| Com. Example 9 | Comp. Example 1 | 687 | 68.6 |
| Com. Example 10 | Comp. Example 2 | 671 | 69.3 |
| Com. Example 11 | Comp. Example 3 | 688 | 68.4 |
| Com. Example 12 | Comp. Example 4 | 675 | 67.5 |

What is claimed is:

1. Acicular magnetic iron oxide particles coated with double coating layers consisting of as a lower layer a Co compound layer containing Co in an amount of 0.4 to 8.0% by weight based on acicular magnetic iron oxide particles and as an upper layer a spinel ferrite layer containing Mn-Zn, Ni-Zn or Mn-Ni-Zn in an amount of 0.1 to 10.0% by weight based on the acicular magnetic iron oxide particles coated with the Co compound, and having an average major axis diameter of 0.5 μm or below and an aspect ratio (major axis:minor axis) of 5:1 or above, and showing a coercive force of 600 Oe or above and an erasing characteristic value of 72.0 dB or above, the ratio of Mn, Ni or Mn-Ni to the sum of Mn, Ni and Zn being 0.1 to 80 atom %, said acicular magnetic iron oxide particles being acicular maghemite particles, acicular magnetite particles or either of said particles containing at least one of Co, Ni, Si, Al, Zn and P.

2. A magnetic recording media produced by coating a substrate with a resin composition containing acicular magnetic iron oxide particles as defined in claim 1.

3. A magnetic recording media according to claim 2, wherein the resin composition contains 60 to 90% by weight of the acicular magnetic iron oxide particles.

4. A magnetic recording media according to claim 2, wherein the substrate is a synthetic resin film selected from the group consisting of polyethylene terephthalate, polyethylene, polypropylene, polycarbonate, polyethylene naphthalate, polyamide, polyamide-imide, polyimide and polysulfone, a metal foil or plate made of aluminum or stainless steel, or paper.

5. A magnetic recording media according to claim 2, wherein the resin is selected from the group consisting of vinyl chloride-vinyl acetate copolymer, vinyl chloride-vinyl acetate-maleic urethane elastomer, butadiene-acrylonitrile copolymer, polyvinylbutyral, a cellulose derivative, polyester resin, polybutadiene, epoxy resin, polyamide resin, polyisocyanate polymer, electron radiation cured acrylic urethane resin and a mixture thereof.

6. A magnetic recording media according to claim 2, which shows a coercive force of 600 Oe or above and an erasing characteristic value of 71.0 dB or above.

* * * * *

UNITED STATES PATENT AND TRADEMARK OFFICE
CERTIFICATE OF CORRECTION

PATENT NO. : 5,120,604

DATED : June 9, 1992

INVENTOR(S) : Nakamura

It is certified that error appears in the above-identified patent and that said Letters Patent is hereby corrected as shown below:

On the title page: Section [30] delete "Aug. 25, 1987 [JP] Japan.....61-248088" and replace by --Oct. 17, 1986 [JP] Japan......61-248088--

Signed and Sealed this

Seventh Day of September, 1993

Attest:

BRUCE LEHMAN

Attesting Officer  Commissioner of Patents and Trademarks